United States Patent
Rose et al.

(10) Patent No.: US 12,148,010 B2
(45) Date of Patent: *Nov. 19, 2024

(54) MULTI-PLATFORM INTEGRATION FOR CLASSIFICATION OF WEB CONTENT

(71) Applicant: Zeta Global Corp., New York, NY (US)

(72) Inventors: David Rose, Atlanta, GA (US); Danny Portman, Atlanta, GA (US)

(73) Assignee: Zeta Global Corp., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/454,557

(22) Filed: Aug. 23, 2023

(65) Prior Publication Data
US 2023/0394536 A1    Dec. 7, 2023

Related U.S. Application Data

(63) Continuation of application No. 17/538,576, filed on Nov. 30, 2021, now Pat. No. 11,769,178.
(Continued)

(51) Int. Cl.
*G06Q 30/0241* (2023.01)
*G06F 16/958* (2019.01)
*G06Q 30/0273* (2023.01)

(52) U.S. Cl.
CPC ....... *G06Q 30/0277* (2013.01); *G06F 16/958* (2019.01); *G06Q 30/0275* (2013.01)

(58) Field of Classification Search
CPC ............ G06Q 30/0277; G06Q 30/0275; G06F 16/958
See application file for complete search history.

(56) References Cited

U.S. PATENT DOCUMENTS 7,966,564 B2    6/2011    Catlin et al.
8,762,382 B2    6/2014    Harrison et al.
(Continued)

FOREIGN PATENT DOCUMENTS

CA    2656195 A1    1/2008

OTHER PUBLICATIONS

"Web Site Classification based on URL and Content: Algerian Vs. non-Algerian Case" Ouessai Abdessamed1, Elberrichi Zakaria EEDIS Laboratory, Faculty of Technology, Department of Computer Science University Djillali Liabes, Algeria (Year: 2015).*
"U.S. Appl. No. 17/538,576, Examiner Interview Summary mailed May 9, 2023", 2 pgs.
"U.S. Appl. No. 17/538,576, Final Office Action mailed Oct. 25, 2022", 15 pgs.
"U.S. Appl. No. 17/538,576, Non Final Office Action mailed Feb. 6, 2023", 12 pgs.
(Continued)

*Primary Examiner* — Alexandru Cirnu
(74) *Attorney, Agent, or Firm* — Schwegman Lundberg & Woessner, P.A.

(57) ABSTRACT

In some examples, a system comprises at least one programmable processor; and a machine-readable medium having instructions stored thereon which, when executed by the at least one programmable processor, cause the at least one programmable processor to execute operations comprising: receiving a first request from at least one user device to execute an instance of an application; transmitting a graphical user interface (GUI) to the at least one user device to be rendered on a display of the at least one user device; receiving a second request, via the GUI, from the at least one user device, to deploy a digital advertisement, the second request including a set of platforms of a plurality of platforms of a multi-platform integration system, a set of settings, a set of parameters, and a set of allocation data; interfacing with each one of the platforms in the set of platforms; and integrating a digital advertisement directly with each one of the platforms in the set of platforms based on the set of settings, the set of parameters and the set of allocation data.

20 Claims, 4 Drawing Sheets

Related U.S. Application Data

(60) Provisional application No. 63/131,303, filed on Dec. 28, 2020.

(56) References Cited

U.S. PATENT DOCUMENTS

| | | | |
|---|---|---|---|
| 9,262,509 | B2 | 2/2016 | Harrison et al. |
| 2002/0073034 | A1 | 6/2002 | Wagner et al. |
| 2010/0198697 | A1 | 8/2010 | Brown et al. |
| 2011/0246297 | A1* | 10/2011 | Buchalter .............. G06Q 30/02 705/14.53 |
| 2015/0161662 | A1* | 6/2015 | Minor ................ G06Q 30/0275 705/14.48 |
| 2020/0193322 | A1 | 6/2020 | Korada et al. |
| 2022/0207572 | A1 | 6/2022 | Rose et al. |

OTHER PUBLICATIONS

"U.S. Appl. No. 17/538,576, Non Final Office Action mailed Apr. 21, 2022".

"U.S. Appl. No. 17/538,576, Notice of Allowance mailed May 23, 2023", 10 pgs.

"U.S. Appl. No. 17/538,576, Response filed Jan. 25, 2023 to Final Office Action mailed Oct. 25, 2022", 14 pgs.

"U.S. Appl. No. 17/538,576, Response filed May 8, 2023 to Non Final Office Action mailed Feb. 6, 2023", 9 pgs.

"U.S. Appl. No. 17/538,576, Response filed Jul. 15, 2022 to Non Final Office Action mailed Apr. 21, 2022", 13 pgs.

"Web Site Classification based on URL and Content: Algerian Vs. non-Algerian Case", Ouessai Abdessamedl, Elberrichi Zakaria EEDIS Laboratory, Faculty of Technology, Department of Computer Science University Djillali Liabes, Algeria, (2015), 8 Pgs.

* cited by examiner

MULTI-PLATFORM INTEGRATION FOR CLASSIFICATION OF WEB CONTENT

CLAIM OF PRIORITY

This patent application is a continuation of U.S. patent application Ser. No. 17/538,576, filed Nov. 30, 2021, which application claims the benefit of priority, under 35 U.S.C. Section 119(e), to Rose, U.S. Provisional Patent Application Ser. No. 63/131,303, entitled "WEBSITE CLASSIFICATION USING IN-BROWSER MACHINE LEARNING", filed on Dec. 28, 2020, which are hereby incorporated by reference herein in their entireties.

TECHNICAL FIELD

This disclosure relates generally to multi-platform integration for web content classification, and in some examples to classifying web pages in order automatically to classify and categorize webpages and, without the use of cookies, relay viewer information to marketers bidding on available inventory on those webpages.

BRIEF DESCRIPTION OF THE DRAWINGS

The subject matter disclosed herein is particularly point out and distinctly claimed in the claims at the conclusion of the specification.

DETAILED DESCRIPTION

Described herein are examples of a multi-platform integration system with an adaptive automatic bidding system using script automatically to classify webpages on a website. An example multi-platform integration system includes a computing system in communication with platforms, a database, and one or more user devices in a networked environment. The computing system hosts an application. The computing system is configured to receive a first request from a user device to execute an instance of the application, transmit a graphical user interface (GUI) to the user device to be rendered on a display of the user device, and receive a second request, via the GUI, from the user device to deploy a digital advertisement. In some examples, the second request includes a set of platforms, a set of settings, a set of parameters, and a set of allocation data. The computing system is further configured to interface with each one of the platforms in the set of platforms and integrate the digital advertisement directly with each one of the platforms in the set of platforms based on the set of settings, the set of parameters and the set of allocation data. In some examples, the multi-platform integration system automates and streamlines the advertising trafficking process, resulting in less time trafficking advertising campaigns, fewer human errors and easy advertising budget and performance management. In some examples, a Visto® UI (i.e., the GUI) renders the performance and allows users to spend across all the platforms in a single UI. In some examples, the multi-platform integration system provides operational efficiency, performance enhancement, and an enhanced system to maintain data integrity by reducing human error.

Figure 1:
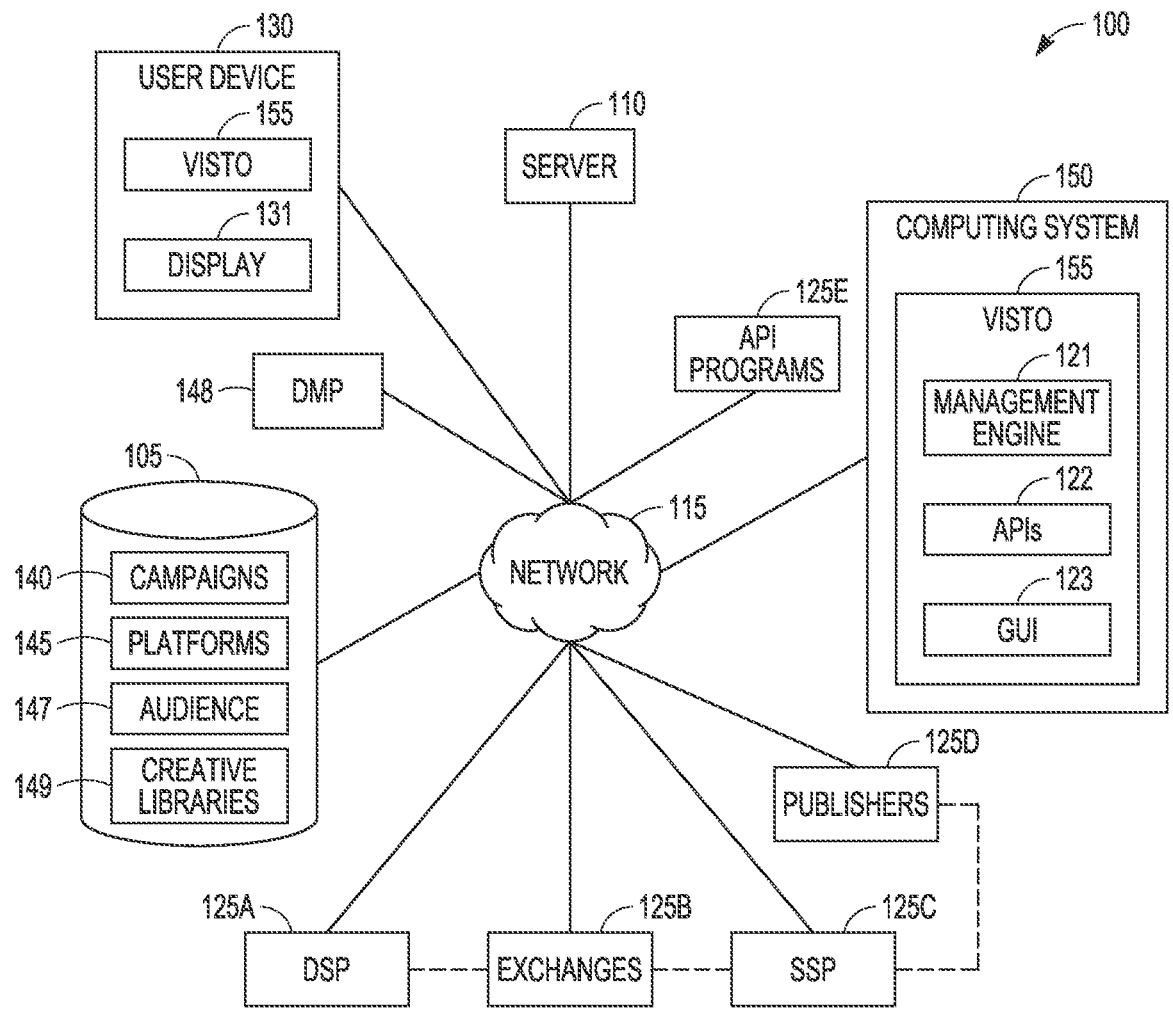
FIG. 1 is a block diagram illustrating a multi-platform integration system in accordance with an example.

FIG. 1 is a block diagram illustrating a multi-platform integration system in accordance with an example. The multi-platform integration system 100 can include one or more computing systems 150, one or more databases 105, one or more servers 110, one or more user computing devices 130, one or more Demand Side Platforms (DSP) 125A, one or more exchanges 125B, one or more Supply Side Platforms (SSP) 125C, one or more publishers 125D, one or more Application Program Interface (API) programs 125e, and a Data Management Platform (DMP) 148. In one example, the computing system 150 can be in communication with the database(s) 105, user devices 130, the DSPs 125A, the exchanges 125B, the SSPs 125C, the publishers 125D, the API programs 125e, a Data Management Platform (DMP) 148, and the creative libraries database 149, via a communications network 115. The computing system 150 can execute a Visto® application 155. The Visto® application 155 can include the management engine 121 and one or more Application Program Interfaces (APIs) 122. In one example, the management engine 121 can be embodied as a Multi-Platform Ad Management Tool (e.g., a Universal Remote). The computing system 150 can also implement an example of the graphical user interface 123. The management engine 121 can implement the multi-platform integration system 100 using the one or more APIs 122. The Visto® application 155 can reside on one of the computing systems 150 and can be accessible to the user device 130. For example, the user device 130 can execute a web browser or other application and can navigate to a universal resource locator (URL) associated with the Visto® application 155 on the computing system 150, and the user device 130 can interact with Visto® application 155 via the web browser. Alternatively, at least a portion of the Visto® application 155 can reside on the user device 130 or one of the servers 110.

In some examples, one or more portions of the communications network 115, can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 150 may include one or more computers or processors configured to communicate with the database(s) 105, user devices 130, the DSPs 125A, the exchanges 125B, the SSPs 125C, the publishers 125D, the API programs 125e, and the DMP 148, via the network 115. The computing system 150 may host one or more applications, such as the Visto application 155, configured to interact with one or more components of the user devices 130, the DSPs 125A, the exchanges 125B, the SSPs 125C, the publishers 125D, the API programs 125e, the DMP 148, and/or facilitates access to the content of the databases 105. The databases 105 may store information/data, as described herein. For example, the databases 105 can include a campaigns database 140, platforms database 145, audience database 147, and a creative libraries database 149. The campaigns database 140 can store information associated with campaigns associated with digital data such as digital advertisements. The platforms database 145 can store information associated with platforms such as media buying platforms.

The audience database 147 can include information associate with audience groups for digital advertisement targeting. The creative libraries database 149 can include information associated with creative assets for digital advertisements. The databases 105 can be located at one or more geographically distributed locations from each other or from the computing system 150. Alternatively, the databases 105 can be included within in the computing system 150.

In an example, a user device 130 can execute the Visto® application 155 (e.g., as it resides on the user device 130 or via a web browser) to interface with the computing system 150. In response to executing the Visto® application 155, the computing system 150 can render the GUI 123 on the user device 130. The computing system 150 can receive input from user device 130, via GUI 123.

A user device 130 can transmit a request to integrate digital data along multiple different platforms, via the Visto® application 155, to the computing system 150. In response to receiving the request the computing system 150 can execute the management engine 121. As an example, the digital data can be a digital advertisement. The digital advertisement can be one or more of an image, video, gif, rich text, audio, or other type of digital data. The user can be an entity such as a company, advertiser, educational institution, marketing agency, or governmental institution. The user device 130 can receive a selection of platforms on which the user wishes to distribute the digital advertisement, via the GUI 123 of the Visto® application 155. The platforms can be media buying platforms such as a DSP platform 125A, SSP platform 125B, exchange 125C, publisher 125D, and API programs 125e. The management engine 121 can receive the selection of platforms, in response to the user device 130 receiving the selection of platforms, via the GUI 123 of the Visto® application 155.

The user device 130 can receive input associated with creating a campaign shell with designated lines, via the GUI 123 of the Visto® application 155. The lines can include placements associated with the campaign. The placements can include attributes such as screens, formats, and targeting. The user device 130 can receive input associated with assigning parameters for the digital advertisement in the Visto® application 155. The parameters can include ad format, screen types, Key Performance Indicators (KPI), etc. The parameters can define the way the advertisement will be delivered. The management engine 121 can receive the input associated with creating a campaign shell with designated lines and the assignment of parameters for the digital advertisement, in response to the user device 130 receiving the input, via the GUI 123 of the Visto® application 155.

The user device 130 can also receive input associated with budget and allocation information, via the GUI 123 of the Visto® application 155. The user device 130 can also receive input associated with a rate and rate type (i.e., type of currency), via the GUI 123 of the Visto® application 155. The rate can be billable cost charged to an advertiser. The user device 130 can also receive input associated with a selection between delivering the digital advertisement based on units or the budget, via the GUI 123 of the Visto® application 155. The management engine 121 can receive the selection of delivering the digital advertisement based on units or budget. In response to inputting a number of units of the digital advertisement a user desires to deliver, the management engine 121 can automatically calculate and render an Ad Budget value, on the GUI 123 of the Visto® application 155. Alternatively, or in addition to, in response to a user inputting an Ad Budget value, the management engine 121 can calculate and/or adjust the number of units of digital advertising to be delivered. The management engine 121 can render the number of units on the GUI 123 of the Visto® application 155.

The user device 130 can also receive input associated with targeting parameters, via the GUI 123 of the Visto® application 155, in order or refine where, when, and to whom the user would like the digital advertisement to be delivered. The user device 130 can also receive input associated with the following targeting parameters: audience, geography, daypart, sellers, and video, white/blacklists. Other parameters are possible.

The audience parameters can be information associated with targeting a focused audience using demographic, behavioral, purchase, search, interest, and other data categories. Audiences are selected from the available data sources such as the audience database 147. For example, the management engine 121 can retrieve the audiences from the audience database 147. The audience database 147 can retrieve audience information from a Data Management Platform (DMP) 148. The DMP 148 can be a centralized data management platform that enables a user to create target audiences based on a combination of first-party and third-party audience data. The audience information can also be retrieved from a selected platform's proprietary segment list.

The geography parameter can include information associated with targeting advertisements based on geographic location. The targeting information can include or exclude geographic regions such as countries, states, metros/Designed Market Areas (DMAs), cities, and zip/postal codes, in which the user would or would not wish to deliver digital advertisements. The daypart parameter can include information associated with delivering digital advertisements based on the days of the week or hours of the day. The user can select the specific days and times on which the user wishes to deliver the digital advertisement.

A seller's parameter can include information associated with targeting a digital advertisement including or excluding specific third-party inventory sellers from open exchange buys. The user can specify the third-party inventory sellers to include or exclude. The video parameter can include information associated with selecting the player size, position, and playback methods on which a digital advertisement will be running. The user can specify the player size, position, and/or playback methods. The white/blacklists parameter can include information associated with including or excluding specific domains or applications in order to control the inventory on which the digital advertisement can be displayed or run. The user can specify the domains or applications to include or exclude.

Some examples may include an in-browser script running on the third-party inventory seller websites to automatically determine the content of the individual webpages in order to relay information to determine desirable or selected content for the available inventory. The management engine 121 can receive the input targeting parameters. The user can select one or more of the aforementioned targeting parameters. Additional targeting parameters can be presented to the user.

The user device 130 can receive input associated with the creative assets of the digital advertisement, via the GUI 123 of the Visto® application 155. The creative assets can include promotional messaging for the user (i.e., advertiser and/or brand). The user can select from two different options to generate the creative assets, add from existing or create new.

The user device 130 receives input associated with a selection of add from existing, via the GUI 123 of the Visto® application 155, the management engine 121 can render a list of creative assets from a creative library on the GUI 123. As an example, the management engine 121 can retrieve a list of creative assets relevant to the user (i.e., advertiser and/or brand) from the creative libraries database 149. The management engine 121 can also render a chosen advertisement format. The management engine 121 can receive the selected creative assets and chose advertisement format based on input from the user device on the GUI 123 of the Visto® application 155.

In some examples, the user device 130 receives input associated with a selection to create new content, from the GUI 123 of the Visto® application 155, the management engine 121 can render an option to create a new creative asset on the GUI 123. The user device 130 can receive input associated with creating new creative asset, via the he GUI 123 of the Visto® application 155. Once a new creative asset is created, the management engine 121 can save the creative asset in a creative library associated with the specific user (user device 130) in the creative libraries database 149.

The management engine 121 can receive the selected creative assets previously created and/or a newly created creative asset. The management engine 121 can render a list of the selected creatives assets including the name, size, an ad server from which the creative asset is hosted (if applicable), and any Secure Sockets Layer (SSL) support on the GUI 123.

In response to completing the selections and input associated with the digital advertisement, the user device 130 can receive a selection to save and close, via the he GUI 123 of the Visto® application 155. The management engine 121 can receive the save and close selection, and save the selected and input information associated with the digital advertisement including selected platforms, parameters, targeting parameters, budget and allocation, and creative assets in the campaigns database 140. The user device 130 can receive a selection to push campaign, via the he GUI 123 of the Visto® application 155. In response to the management engine 121 receiving the selection to push campaign, the management engine 121 can deploy the digital advertisement to the selected platforms. The digital advertisement can be deployed based on the parameters, targeting parameters, budget and allocation, and creative assets. The management engine 121 can use the APIs 122 to interface and integrate the digital advertisement in each of the selected platforms. In response to deploying the digital advertisement, the management engine 121 can render delivery and performance information associated with the digital advertisement for each platform on the GUI 123. The user device 130 can receive input associated with adjustments in the budget and allocation information while the digital advertisement is deployed. In response to the user device 130, receiving a subsequent selection of push campaign, after adjusting the budget and allocation information, the management engine can dynamically reallocate the budget among each of the platforms based on the adjustments and distribute the reallocations to each of the platforms.

As described above, the platforms can be one or more of a DSP 125a, an exchange 125b, a SSP 125c, publishers 125d, and API programs 125e. A DSP 125a can enable buyers with direct real-time bidding access across multiple sources of digital advertisement inventory. The DSP 125a enables advertisers to purchase impressions (i.e., a view or an ad view), across publisher sites (i.e., publishers 125d), but targeted to specific users based on information such as their location and their previous browsing behavior. The management engine 121 can deploy the digital advertisement to a DSP 125a. The management engine 121 can purchase the impressions from publisher sites based on the parameters, targeting parameters, budget and allocation, and creative assets assigned by the user for the digital advertisement.

An exchange 125b can be an ad exchange. The exchange 125b can be used by advertisers (i.e., the user) to purchase advertisement space as well as by publishers to sell advertising space. The buying and selling can often be executed using real-time auctions. An exchange 125b can be a big pool of ad impressions. Publishers 125d can put their ad impressions into the pool. An advertiser (i.e., the user) can purchase the ad impressions. The purchases can be made in real time based on information such as the previous behavior of the user an ad is being served to, time of day, device type, ad position and more. The management engine 121 can deploy the digital advertisement directly to an exchange 125b such as an ad exchange. The management engine 121 can purchase ad impressions for the digital advertisements based on the parameters, targeting parameters, budget and allocation, and creative assets for the digital advertisement using the exchange 125b.

A SSP 125c can publishers 125d to sell their inventory to exchanges 125b and DSP 125a. The management engine 121 can deploy the digital advertisement directly to the SSP 125c. The management engine 121 can purchase a publisher's 125d inventory directly from the SSP 125c based on the parameters, targeting parameters, budget and allocation, and creative assets for the digital advertisement.

A publisher 125d can be an entity which publishes (i.e., displays or renders) the digital advertisement. The publisher 125d can be a website, domain, web application, or any other type of digital media. The publisher 125d can sell inventory such as ad impressions. Ad impressions can be views, view counts, and/or advertisement space. The management engine 121 can purchase impressions and deploy the digital advertisement directly to on specified publishers 125d. The management engine 121 can deploy the digital advertisement on the specified publishers 125d based on parameters, targeting parameters, budget and allocation, and creative assets for the digital advertisement. As a non-limiting example, the digital advertisement can be an image embedded with a hyperlink. The management engine 121 can embed the image of a specified size, with the embedded hyperlink on a publisher's website at a specified location on the website for a specified duration of time. The management engine 121 can indicate which geographic locations the digital advertisement is to be displayed.

An API program 125e can be custom tools developed enables advertisers and/or agencies (i.e., the user) to publish the digital advertisement with various publishers. As an example, various social media entities can have different API programs to publish the digital advertisements. The management engine 121 can deploy the digital advertisement directly to specified API programs 125e based on based on parameters, targeting parameters, budget and allocation, and creative assets for the digital advertisement.

In some examples, a digital advertisement can be deployed directly to a DSP 125a platform, to purchase ad space/impressions for the digital advertisement. The publishers 125d can interface with the SSP 125c to sell ad space/impressions. The DSP 125a and SSP 125b can interface with one another, via the exchange 125b.

As described above with respect to FIG. 1, the multi-platform integration system (e.g., multi-platform integration system 100 as shown in FIG. 1) can include a GUI (e.g., GUI 123 as shown in FIG. 1) rendered on a display (e.g., display 131 as shown in FIG. 1) of the user device (e.g., user device 130 as shown in FIG. 1) to facilitate deploying and integrating a digital advertisement on various platforms.

Figure 2:
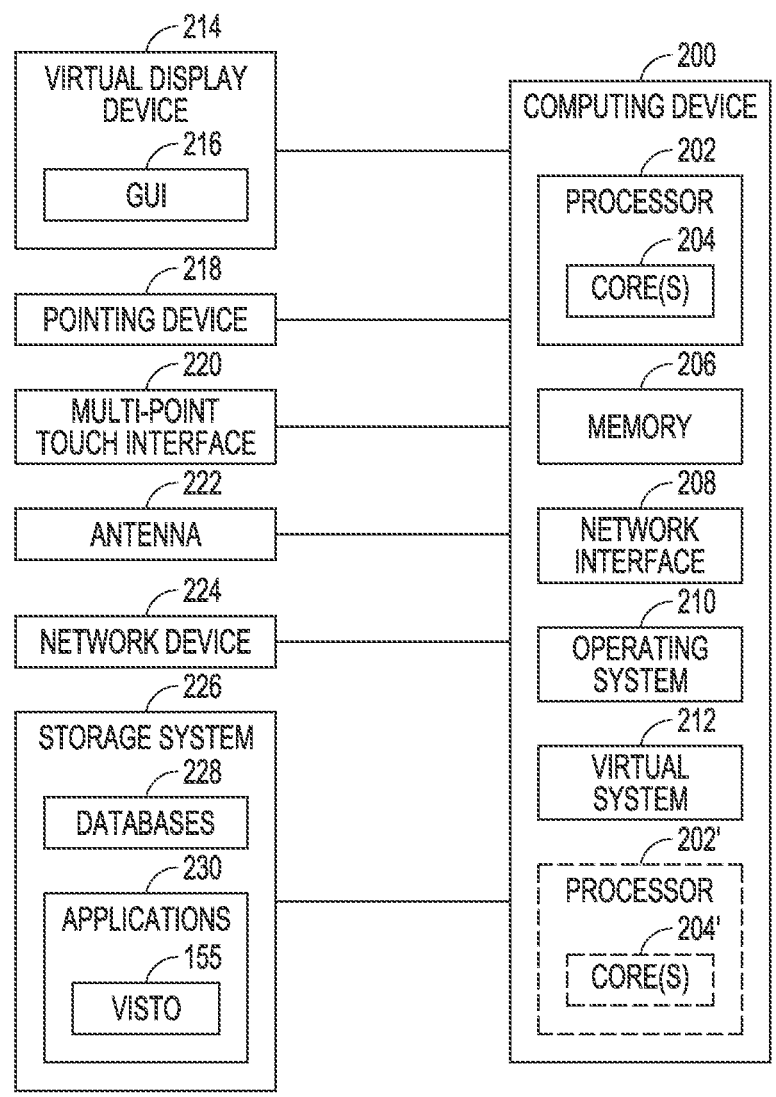
FIG. 2 illustrates a computing device in accordance with an example.

FIG. 2 is a block diagram of an example computing device for implementing some examples. The computing device 200 may be, but is not limited to, a smartphone, laptop, tablet, desktop computer, server, or network appliance. The computing device 200 can be embodied as part of the computing system, user device, platforms (i.e., DSP, exchanges, SSP, publishers, APis), and the DMP. The computing device 200 includes one or more non-transitory computer-readable media for storing one or more computer-executable instructions or software for implementing some examples. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 206 included in the computing device 200 may store computer-readable and computer-executable instructions or software (e.g., applications 230 such as the Visto® application 155 and management engine 121) for implementing exemplary operations of the computing device 200. The computing device 200 also includes configurable and/or programmable processor 202 and associated core(s) 204, and optionally, one or more additional configurable and/or programmable processor(s) 302' and associated core(s) 304' (for example, in the case of computer systems having multiple processors/cores), for executing computer-readable and computer-executable instructions or software stored in the memory 206 and other programs for implementing some examples. Processor 202 and processor(s) 302' may each be a single core processor or multiple core (204 and 304') processor. Either or both of processor 202 and processor(s) 302' may be configured to execute one or more of the instructions described in connection with computing device 200.

Virtualization may be employed in the computing device 200 so that infrastructure and resources in the computing device 200 may be shared dynamically. A virtual machine 212 may be provided to handle a process running on multiple processors so that the process appears to be using only one computing resource rather than multiple computing resources. Multiple virtual machines may also be used with one processor.

Memory 206 may include a computer system memory or random-access memory, such as DRAM, SRAM, EDO RAM, and the like. Memory 206 may include other types of memory as well, or combinations thereof.

A user may interact with the computing device 200 through a visual display device 214, such as a computer monitor, which may display one or more graphical user interfaces 216, multi touch interface 220, and a pointing device 218.

The computing device 200 may also include one or more storage devices 226, such as a hard-drive, CD-ROM, or other computer readable media, for storing data and computer-readable instructions and/or software that implement some examples (e.g., applications i.e., the Visto® application 155). For example, exemplary storage device 226 can include one or more databases 228 for storing information regarding, campaigns, platforms, audiences, and creative libraries. The databases 228 may be updated manually or automatically at any suitable time to add, delete, and/or update one or more data items in the databases.

The computing device 200 can include a network interface 208 configured to interface via one or more network devices 224 with one or more networks, for example, Local Area Network (LAN), Wide Area Network (WAN) or the Internet through a variety of connections including, but not limited to, standard telephone lines, LAN or WAN links (for example, 802.11, Ti, T3, 56 kb, X.25), broadband connections (for example, ISDN, Frame Relay, ATM), wireless connections, controller area network (CAN), or some combination of any or all of the above. In some examples, the computing system can include one or more antennas 222 to facilitate wireless communication (e.g., via the network interface) between the computing device 200 and a network and/or between the computing device 200 and other computing devices. The network interface 208 may include a built-in network adapter, network interface card, PCMCIA network card, card bus network adapter, wireless network adapter, USB network adapter, modem, or any other device suitable for interfacing the computing device 200 to any type of network capable of communication and performing the operations described herein.

The computing device 200 may run operating system 210, such as versions of the Microsoft® Windows® operating systems, different releases of the Unix and Linux operating systems, versions of the MacOS® for Macintosh computers, embedded operating systems, real-time operating systems, open-source operating systems, proprietary operating systems, or other operating systems capable of running on the computing device 200 and performing the operations described herein. In some examples, the operating system 210 may be run in native mode or emulated mode. In an example, the operating system 210 may be run on one or more cloud machine instances.

Figure 3:
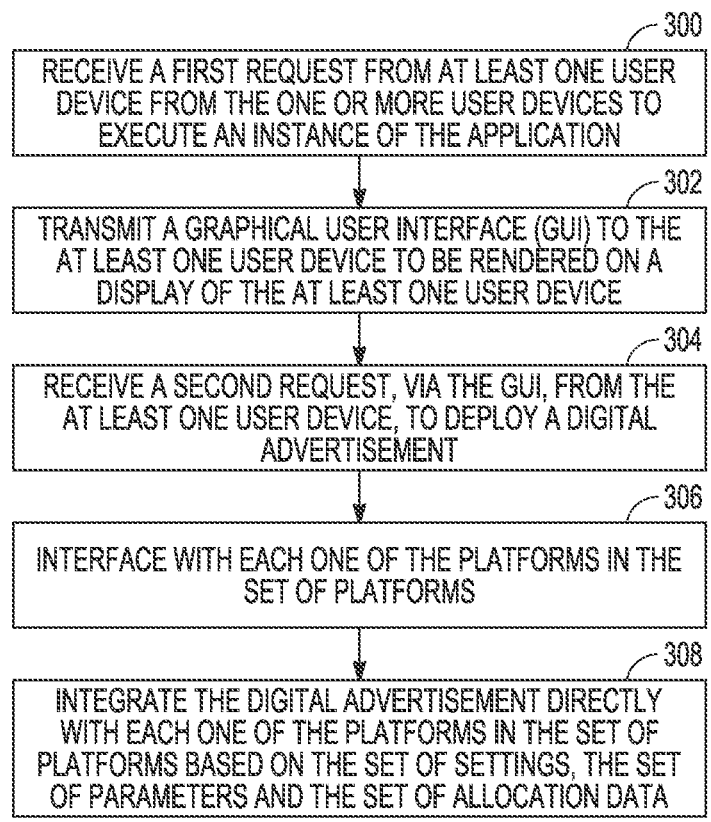
FIG. 3 is a flowchart illustrating an exemplary process performed by the multiplatform integration system according to an example.

FIG. 3 is a flowchart illustrating an exemplary process performed in the multi-platform integration system. In operation 300, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 302, the computing system can transmit a graphical user interface (GUI) (i.e., GUI 123 as shown in FIG. 1) to the at least one user device to be rendered on a display of the at least one user device. In operation 304, the computing system can receive a second request, via the GUI, from the at least one user device, to deploy a digital advertisement. The second request includes a set of platforms of the plurality of platforms, a set of settings, a set of parameters, and a set of allocation data. In operation 306, the computing system can interface with each one of the platforms in the set of platforms. In operation 308, the computing system can integrate the digital advertisement directly with each one of the platforms in the set of platforms based on the set of settings, the set of parameters and the set of allocation data.

Figure 4:
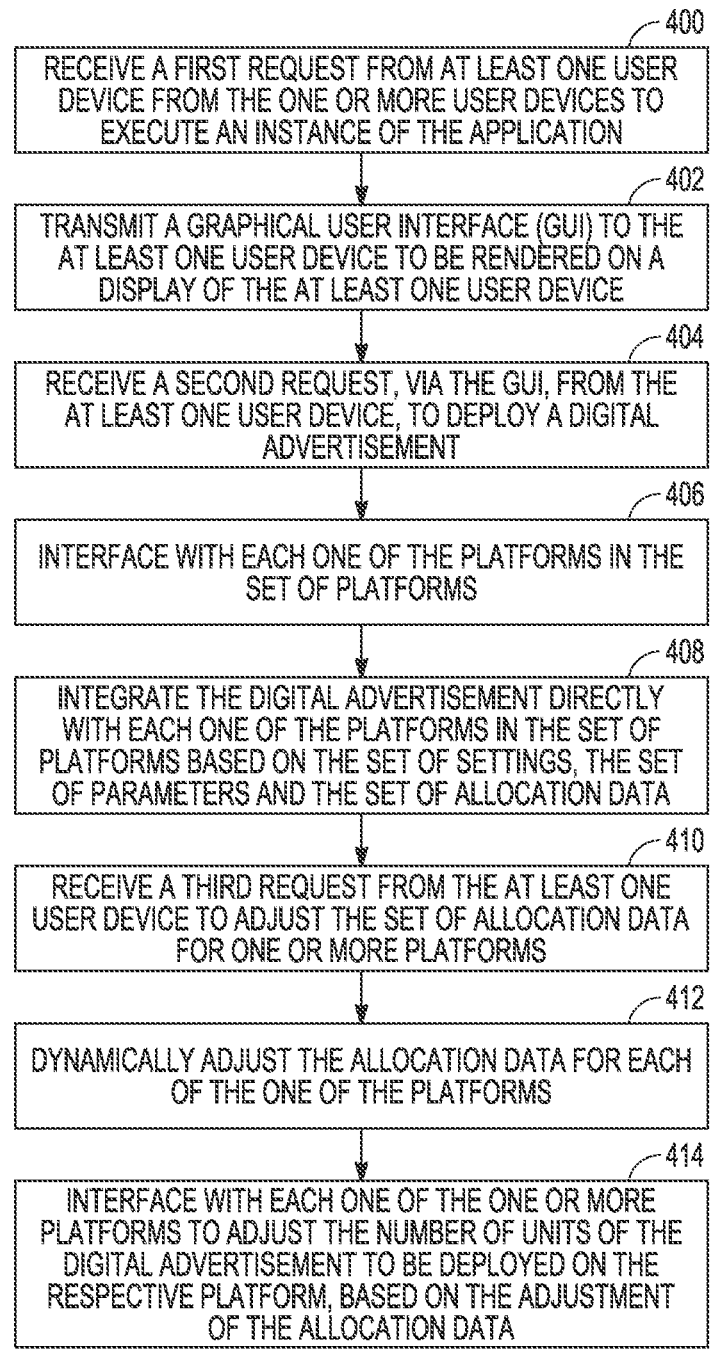
FIG. 4 is a flowchart illustrating an exemplary process performed the multi-platform integration system according to an example.

FIG. 4 is a flowchart illustrating exemplary operations in a method. In operation 400, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 402, the computing system can transmit a graphical user interface (GUI) (i.e., GUI 123 as shown in FIG. 1) to the at least one user device to be rendered on a display of the at least one user device. In operation 404, the computing system can receive a second request, via the GUI, from the at least one user device, to deploy a digital advertisement. The second request includes a set of platforms of the plurality of platforms, a set of settings, a set of parameters, and a set of allocation data. In operation 406, the computing system can interface with each one of the platforms in the set of platforms. In operation 408, the computing system can integrate the digital advertisement directly with each one of the platforms in the set of platforms based on the set of settings, the set of parameters and the set of allocation data. The allocation data is associated with a number of units of the digital advertisement to be deployed to each platform in the set of platforms. In operation 410 the computing system can receive a third request from the at least one user device to adjust the set of allocation data for one or more platforms of the set of platforms on which the digital advertisement has been integrated, after the digital advertisement is integrated with each one of the platforms of the set of platforms. In operation 412, the computing system can dynamically adjust the allocation data for each of the one of the platforms. In operation 414, the computing system can interface with each one of the one or more platforms to adjust the number of units of the digital advertisement to be deployed on the respective platform, based on the adjustment of the allocation data.

In some examples, the websites have in-browser technology to classify the content and themes of webpages. Using real-time scoring of a webpage will serve to more precisely target and contextualize content to an end-consumer. In some examples, the end consumer or user triggers an instance of a webpage running an in-browser script, the meta data, content, and text of the website is processed through a real-time classification model. The classification model then sends webpage classification to a selected recipient or target destination. The recipient may include an end consumer or user.

In some examples, the scripts crawl all the sub-URL webpages on the websites. That is, the scripts will create a cascading analysis of a website using URL parsing, HTML, metadata, and text classification. For example, if CNN content generally includes news item or content, individual pages on CNN may have specific areas of interest such as political, sports, science, weather, business, and the like. Further, these topics may include further categorizations including geographic specifics.

In some examples, webpages are scored in real-time to provide more detailed information in the request to fill available inventory. In some examples, the system is used for real-time dynamic website personalization or DCO content.

Some examples run machine learning scripts on the third-party website browsers to determine the websites content in order to include the information. All data stays on an end-consumer device and is useful for low-latency interference, as well as for privacy preservations.

In some examples, the in-browser script uses machine learning to perform real-time classification of custom webpages and customizations to be categorized. Models can be pre-trained remotely and loaded into browsers. Pre-trained models can be further trained in the browser. In some examples, the machine learning allows for real-time classification of custom webpages and customizations to be categorized. This allows for more granular classification than domain level context that can be received by service providers that classify top level domains. Further, the in-browser learning can parse elements on each page including placement of images, text, comments, and the like. Using machine learning, the script can parse what elements are in images using website metadata and contextual cues. The script can further learn contextual queues to parse what the meaning of the text and the leanings of any comments to the main text.

Some examples can use any form of natural language processing to classify and index the text including semantic distance classification as disclosed in U.S. Pat. No. 9,262,509 which is incorporated by reference herein.

Some examples can use data structures for natural language processing as disclosed in U.S. Pat. Nos. 8,762,382, 7,966,564, 9,262,5409 and United States Patent Publication 2020/0193322 all of which are incorporated by reference herein.

In some examples, a URL crawler differs from a domain crawler chiefly in speed and simplicity of internal implementation of the actual crawler itself. The interfaces (command line, web, and drb) and the data storage schemes may be the same, in some examples. In some examples, a wrapper invokes executable links repeatedly, with a thread-safe queue ensuring that only a fixed number of downloads are running concurrently. Downloads that exceed a specified limit are stopped and the slot is given to a new links process. In some examples, a URL crawler differs from a standard search engine crawler in at least the following ways: an index is not built based on keywords, but based on categories or keyword counts per document. The classification scoring may be more granular than domain level context as used in other services such as Oracle Grapeshot and the like.

Thus, in some examples a computing system comprises: at least one programmable processor; and a machine-readable medium having instructions stored thereon which, when executed by the at least one programmable processor, cause the at least one programmable processor to execute operations comprising: receiving a first request from at least one user device to execute an instance of an application; transmitting a graphical user interface (GUI) to the at least one user device to be rendered on a display of the at least one user device; receiving a second request, via the GUI, from the at least one user device, to deploy a digital advertisement, the second request including a set of platforms of a plurality of platforms of a multi-platform integration system, a set of settings, a set of parameters, and a set of allocation data; interfacing with each one of the platforms in the set of platforms; and integrating a digital advertisement directly with each one of the platforms in the set of platforms based on the set of settings, the set of parameters and the set of allocation data.

In some examples, the set of allocation data is associated with a number of units of the digital advertisement to be deployed to each platform in the set of platforms.

In some examples, the operations further comprise receiving a third request from the at least one user device to adjust the set of allocation data for one or more platforms of the set of platforms on which the digital advertisement has been integrated, after the digital advertisement is integrated with each one of the platforms of the set of platforms.

In some examples, the operations further comprise dynamically adjusting the set of allocation data for each of the one of the platforms.

In some examples, the operations further comprise interfacing with each one of the one or more platforms to adjust the number of units of the digital advertisement to be deployed on a respective platform, based on an adjustment of the set of allocation data.

In some examples, a method comprises, at least: receiving a first request from at least one user device to execute an instance of an application; transmitting a graphical user interface (GUI) to the at least one user device to be rendered on a display of the at least one user device; receiving a second request, via the GUI, from the at least one user device, to deploy a digital advertisement, the second request including a set of platforms of a plurality of platforms of a multi-platform integration system, a set of settings, a set of parameters, and a set of allocation data; interfacing with each one of the platforms in the set of platforms; and integrating a digital advertisement directly with each one of the platforms in the set of platforms based on the set of settings, the set of parameters and the set of allocation data.

In some examples, the set of allocation data is associated with a number of units of the digital advertisement to be deployed to each platform in the set of platforms.

In some examples, the method further comprises receiving a third request from the at least one user device to adjust the set of allocation data for one or more platforms of the set of platforms on which the digital advertisement has been integrated, after the digital advertisement is integrated with each one of the platforms of the set of platforms.

In some examples, the method further comprises dynamically adjusting the set of allocation data for each of the one of the platforms.

In some examples, the method further comprises interfacing with each one of the one or more platforms to adjust the number of units of the digital advertisement to be deployed on a respective platform, based on an adjustment of the set of allocation data.

In some examples, a non-transitory machine-readable medium comprises instructions which, when read by a machine, cause the machine to perform operations comprising, at least: receiving a first request from at least one user device to execute an instance of an application; transmitting a graphical user interface (GUI) to the at least one user device to be rendered on a display of the at least one user device; receiving a second request, via the GUI, from the at least one user device, to deploy a digital advertisement, the second request including a set of platforms of a plurality of platforms of a multi-platform integration system, a set of settings, a set of parameters, and a set of allocation data; interfacing with each one of the platforms in the set of platforms; and integrating a digital advertisement directly with each one of the platforms in the set of platforms based on the set of settings, the set of parameters and the set of allocation data.

In some examples, the set of allocation data is associated with a number of units of the digital advertisement to be deployed to each platform in the set of platforms.

In some examples, the operations further comprise receiving a third request from the at least one user device to adjust the set of allocation data for one or more platforms of the set of platforms on which the digital advertisement has been integrated, after the digital advertisement is integrated with each one of the platforms of the set of platforms.

In some examples, the operations further comprise dynamically adjusting the set of allocation data for each of the one of the platforms.

In some examples, the operations further comprise interfacing with each one of the one or more platforms to adjust the number of units of the digital advertisement to be deployed on a respective platform, based on an adjustment of the set of allocation data.

In describing some examples, specific terminology is used for the sake of clarity. For purposes of description, each specific term is intended to at least include all technical and functional equivalents that operate in a similar manner to accomplish a similar purpose. Additionally, in some instances where a particular example includes a plurality of system elements, device components or method steps, those elements, components, or steps may be replaced with a single element, component, or step. Likewise, a single element, component or step may be replaced with a plurality of elements, components or steps that serve the same purpose. Moreover, while some examples have been shown and described with references to particular examples thereof, those of ordinary skill in the art will understand that various substitutions and alterations in form and detail may be made therein without departing from the scope of the present disclosure. Further still, other aspects, functions, and advantages such as different combinations of the described examples are also within the scope of the present disclosure.

The invention claimed is:

1. A system comprising:
   at least one programmable processor; and
   a machine-readable medium having processor-executable instructions stored thereon which, when executed by the at least one programmable processor, cause the at least one programmable processor to:
   transmit a graphical user interface (GUI) to at least one user device to be rendered on a display of the at least one user device;
   receive a request, via the GUI, from the at least one user device, to deploy a digital advertisement, the request including a set of platforms of a plurality of platforms and a set of allocation data;
   integrate a digital advertisement directly with each of the platforms in the set of platforms based on the set of allocation data; and
   dynamically adjust the set of allocation data for each of the platforms,
   wherein the dynamic adjustment of the set of allocation data for each of the platforms comprises:
   running an in-browser script to crawl data associated with one or more sub-URL webpages of a website of each of the platforms and to create a cascading analysis of the website using one or more of a URL parsing, HTML metadata, and text classification;
   the in-browser script executing in real-time a machine learning model to categorize the crawled data associated with the one or more sub-URL webpages to generate a webpage classification for each of the platforms, wherein machine-learning used by the in-browser script parses elements of the sub-URL webpages, the elements including one or more of a placement of images, a text, and comments on the sub-URL webpages, and wherein the machine-learning used by the in-browser script further learns or uses contextual queues to parse a meaning of the text or comments; and
   dynamically adjusting the set of allocation data for each of the platforms based on the webpage classification.

2. The system of claim 1, wherein the set of allocation data is associated with a number of units of the digital advertisement to be deployed to each platform in the set of platforms.

3. The system of claim 1, wherein, when executed by the at least one programmable processor, the processor-executable instructions cause the at least one processor to:
receive a second request from the at least one user device to adjust the set of allocation data for one or more platforms of the set of platforms on which the digital advertisement has been integrated, after the digital advertisement is integrated with each one of the platforms of the set of platforms.

4. The system of claim 1, wherein the request includes a configuration of a line associated with a campaign shell for a corresponding campaign including the digital advertisement, the line corresponding to a customized placement of the digital advertisement configured based on a screen type of the at least one user device.

5. The system of claim 1, wherein when executed by the at least one programmable processor, the processor-executable instructions cause the at least one processor to:
interface with one or more of the set of platforms to adjust a number of units of the digital advertisement to be deployed on a particular platform, based on an adjustment of the set of allocation data.

6. The system of claim 1, wherein the machine learning model is a pre-trained model that is further trained in a browser running the in-browser script.

7. The system of claim 1, wherein the machine learning model categorizes the crawled data associated with the one or more sub-URL webpages to generate a webpage classification for one or more webpages of a website of one or more of the set of platforms.

8. The system of claim 1, wherein, when executed by the at least one programmable processor, the processor-executable instructions cause the at least one processor to:
collect the crawled data using URL crawler that builds an index of the crawled data using at least one of one or more content categories and keyword counts per document.

9. The system of claim 1, wherein, when executed by the at least one programmable processor, the processor-executable instructions cause the at least one processor to:
collect the crawled data using a wrapper that invokes executable links repeatedly and a thread-safe queue that ensures only a fixed number of linked downloads are running concurrently.

10. The system of claim 9, wherein, when executed by the at least one programmable processor, the processor-executable instructions cause the at least one processor to:
use the thread-safe queue to stop a linked download that exceeds a specified limit; and
give a slot in the queue previously filled by the stopped download to a new linked download process.

11. A method comprising:
transmitting a graphical user interface (GUI) to at least one user device to be rendered on a display of the at least one user device;
receiving a request, via the GUI, from the at least one user device, to deploy a digital advertisement, the request including a set of platforms of a plurality of platforms and a set of allocation data;
integrating a digital advertisement directly with each of the platforms in the set of platforms based on the set of allocation data; and
dynamically adjusting the set of allocation data for each of the platforms,
wherein the dynamically adjusting of the set of allocation data for each of the platforms comprises:
running an in-browser script to crawl data associated with one or more sub-URL webpages of a website of each of the platforms and to create a cascading analysis of the website using one or more of a URL parsing, HTML metadata, and text classification;
the in-browser script executing in real-time a machine learning model to categorize the crawled data associated with the one or more sub-URL webpages to generate a webpage classification for each of the platforms, wherein machine-learning used by the in-browser script parses elements of the sub-URL webpages, the elements including one or more of a placement of images, a text, and comments on the sub-URL webpages, and wherein the machine-learning used by the in-browser script further learns or uses contextual queues to parse a meaning of the text or comments; and
dynamically adjusting the set of allocation data for each of the platforms based on the webpage classification.

12. The method of claim 11, wherein the set of allocation data is associated with a number of units of the digital advertisement to be deployed to each platform in the set of platforms.

13. The method of claim 11, further comprising receiving a second request from the at least one user device to adjust the set of allocation data for one or more platforms of the set of platforms on which the digital advertisement has been integrated, after the digital advertisement is integrated with each one of the platforms of the set of platforms.

14. The method of claim 11, wherein the request includes a configuration of a line associated with a campaign shell for a corresponding campaign including the digital advertisement, the line corresponding to a customized placement of the digital advertisement configured based on a screen type of the at least one user device.

15. The method of claim 11, further comprising interfacing with one or more of the set of platforms to adjust a number of units of the digital advertisement to be deployed on a particular platform, based on an adjustment of the set of allocation data.

16. The method of claim 11, wherein the machine learning model is a pre-trained model that is further trained in a browser running the in-browser script.

17. The method of claim 11, wherein the machine learning model categorizes the crawled data associated with the one or more sub-URL webpages to generate a webpage classification for one or more webpages of a website of one or more of the set of platforms.

18. The method of claim 11, further comprising collecting the crawled data using URL crawler that builds an index of the crawled data using at least one of one or more content categories and keyword counts per document.

19. The method of claim 11, further comprising collecting the crawled data using a wrapper that invokes executable links repeatedly and a thread-safe queue that ensures only a fixed number of linked downloads are running concurrently.

20. The method of claim 19, further comprising using the thread-safe queue to stop a linked download that exceeds a specified limit; and
giving a slot in the queue previously filled by the stopped download to a new linked download process.

* * * * *